J. C. EAKENS.
WHEEL RIM AND TIRE STRUCTURE.
APPLICATION FILED JULY 7, 1917.
1,248,636.
Patented Dec. 4, 1917.
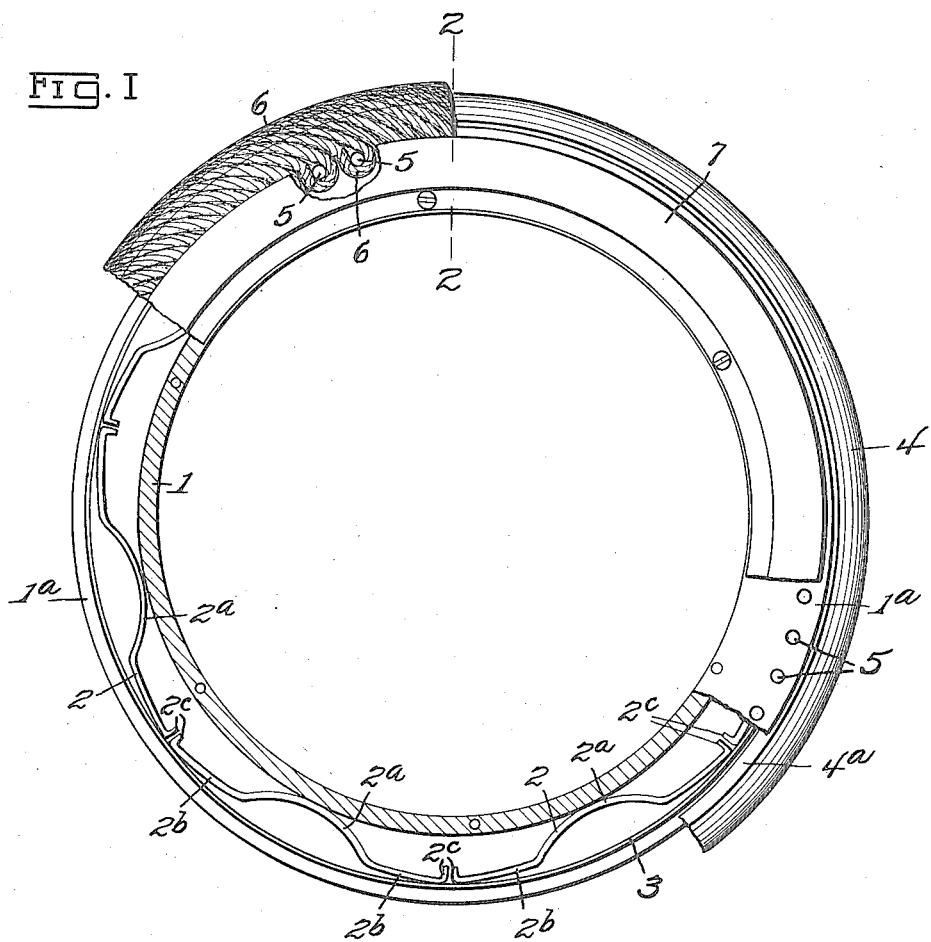
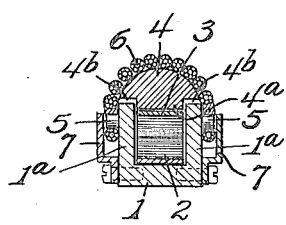
WITNESSES:
W. B. Erskine
W. F. Keefer
INVENTOR.
James C. Eakens
BY
H. E. Dunlap
ATTORNEY.

UNITED STATES PATENT OFFICE.

JAMES C. EAKENS, OF MINGO JUNCTION, OHIO, ASSIGNOR OF ONE-HALF TO E. C. BRANDFASS, OF STEUBENVILLE, OHIO.

WHEEL RIM AND TIRE STRUCTURE.

1,248,636.

Specification of Letters Patent.

Patented Dec. 4, 1917.

Application filed July 7, 1917. Serial No. 179,261.

*To all whom it may concern:*

Be it known that I, JAMES C. EAKENS, a citizen of the United States of America, and resident of Mingo Junction, county of Jefferson, and State of Ohio, have invented certain new and useful Improvements in Wheel Rims and Tire Structures, of which the following is a specification.

This invention relates broadly to wheel rims, and more particularly to a wheel rim and tire structure for motor vehicles.

The primary object of the invention is to provide a wheel rim and tire structure which is extremely durable, presenting to the road a wear-resisting surface or tread of great efficiency, and which possesses a degree of resiliency approximating that of a pneumatic tire.

A further object is to provide a device of the character mentioned which is so constructed that the tread portion thereof, when worn out, may be readily renewed at comparatively small expense.

With these and other objects in view, the invention resides in the features of construction, arrangement of parts and combinations of elements which will hereinafter be fully described, reference being had to the accompanying drawings, in which—

Figure 1 is a view of the invention in side elevation and partly in detail section, and—

Fig. 2 is a transverse section on the line 2—2, Fig. 1.

Referring to said drawings, in which like designating characters distinguish like parts throughout the several views—

1 indicates a circular one-piece rim proper, the same being of channel form in cross section. Fitted loosely within the channel of said rim 1 is a plurality of segmental springs 2, each consisting of a length of flat resilient metal bent to form a central bowed portion $2^a$ and opposite substantially flat end portions $2^b$ having angularly disposed terminals $2^c$. Said springs are placed end to end throughout the entire periphery of the rim and occupy positions wherein their bowed portions $2^a$ rest upon the inner or body portion of said rim 1 and wherein the terminals $2^c$ of adjacent springs 2 lie contiguous to each other and are adapted to assume abutting relation when compressed.

Encircling said springs 2 and located inward somewhat with respect to the peripheries of the side members $1^a$ of the rim 1 is a spring 3 composed of a single piece of flat resilient metal and which rests upon or against the end portions $2^b$ of the springs 2.

Mounted in encircling relation to the rim 1 and having an inner annular rib $4^a$ fitted between the side members $1^a$ is a tire-core or filler 4 composed of a tough flexible material, preferably a woven fiber consisting of asbestos and hemp. The body of said filler is of approximately semi-circular form in cross section, having lateral undercuts $4^b$ defining said rib $4^a$ and in which the edges of said side members $1^a$ are received.

Rigidly mounted upon, or formed integral with, the outer faces of said side members $1^a$ adjacent to the edges of the latter and extending entirely around the same in closely spaced relation is a plurality of short projecting pins or studs 5. Diagonally crossing the convex face of the filler 4 from side to side and successively looped over the studs 5 at opposite sides of the rim is a cable 6 which constitutes the tread or wearing surface of the device. As shown, said cable is laid in closely engaging parallel laps, wholly covering the surface of the filler 4. Bolted or otherwise removably attached to each of the opposite sides of the rim 1 is a guard ring 7 of Z-bar shape in cross section, which is designed to overlie the ends of the studs 5 for maintaining the cable in looped relation to the latter, as shown.

In practice, road shocks are absorbed to a large extent by the springs 2 and 3 which underlie the flexible filler 4. As is apparent, the cable and the underlying filler yield under impacts and the weight imposed thereon against the resistance jointly offered by said springs.

The cable 6 is preferably composed of fine woven or interlaced wires and offers great resistance to road wear. As the fine wires are worn through or broken the ends thereof become pressed into the interstices in and between the laps of the cable forming a closely matted mass which possesses long wearing qualities.

What is claimed is—

1. A wheel rim and tire structure comprising a channel rim, a flexible tire core or filler encircling said rim and having a portion disposed in said channel, resilient elements in said channel upon which said core is seated, outwardly projecting spaced studs carried by the outer lateral faces of said rim, a cable disposed in covering relation to the outer surface of said core and retaining the latter in place, said cable being lapped back and forth in parallel contacting laps across said core and looped at opposite sides over said studs, and means carried by said rim for retaining the loops of said cable on said studs.

2. A wheel rim and tire structure comprising a channel rim, a flexible tire core or filler encircling said rim and having a portion disposed in said channel, resilient means in said channel in underlying relation to said core, outwardly projecting spaced studs carried by the outer lateral faces of said rim, a cable disposed in covering relation to the outer surface of said core, said cable being lapped back and forth in parallel contacting laps across said core and looped at opposite sides over said studs, and rings attached to the sides of said rim in overlying relation to the ends of said studs.

3. A wheel rim and tire structure comprising a channel rim, resilient means located within the channel of said rim, a flexible tire core or filler encircling said rim and having a portion disposed in said channel in seated relation to said resilient means, outwardly projectng spaced studs carried by the outer lateral faces of said rim, a cable disposed in covering relation to the outer surface of said core and maintaining the latter in place, said cable being looped over said studs and extending diagonally back and forth across said filler in parallel contacting laps and means carried by said rim retaining the loops of said cable on said studs.

In testimony whereof, I affix my signature in presence of two suscribing witnesses.

JAMES C. EAKENS.

Witnesses:
GEORGE SMITH,
JOHN DUNN.